June 15, 1965 R. E. KAASHOEK 3,189,867
BATTERY CABLE CONNECTOR
Filed July 25, 1963

INVENTOR.
ROY E. KAASHOEK
BY
ATTORNEYS 3,189,867
BATTERY CABLE CONNECTOR
Roy E. Kaashoek, 1322 Sigsbee SE., Grand Rapids, Mich.
Filed July 25, 1963, Ser. No. 297,519
1 Claim. (Cl. 339—226)

This invention relates to battery cable connectors. More particularly, this invention relates to a battery cable clamp for operably connecting a battery cable to the terminal post of a battery, an improved means being provided for removing the clamp from the post of the battery.

Several types of battery cable connectors and clamps are presently in existence for connecting a battery cable to the terminal post of the battery. All of these connectors exhibit inherent disadvantages. Due to the inherent characteristics of the materials used in the fabrication of a battery, these connectors are at times almost impossible to remove from the terminal post of the battery. Many times, the clamps have become so firmly positioned after a period of time that the battery is ruined during attempts to remove the cable from the battery. In some instances, special tools have been provided in order to facilitate the loosening of the clamp without ruining the battery. However, with all of the various types of clamps provided, the removal of a battery cable from the terminal post of a battery has remained a difficult problem and most annoying to those people working with batteries.

It is therefore an object of this invention to provide an improved battery cable clamp.

Another object of this invention is the provision of a battery cable clamp which incorporates as part of its structure an improved means for removing the clamp from the terminal post of a battery.

Another object of this invention is the provision of such a battery cable clamp which achieves the above results, yet maintains a simplicity of structure and operation and is a competitive article of manufacture.

These and other objects of this invention will become obvious to those skilled in the relevant arts upon reading the following specification in conjunction with the accompanying drawings, wherein.

Briefly, this invention relates to a battery cable clamp for operably connecting a battery cable to the terminal post of a battery, comprising a clamping element, the clamping element having an opening for receiving a battery terminal post. The element is split and has a pair of legs extending therefrom on opposite sides of the split, the positioning of the legs determining the size of the opening. Means is provided on both sides of one of the legs for moving that leg in either direction with respect to the other of the legs.

Figure 1:
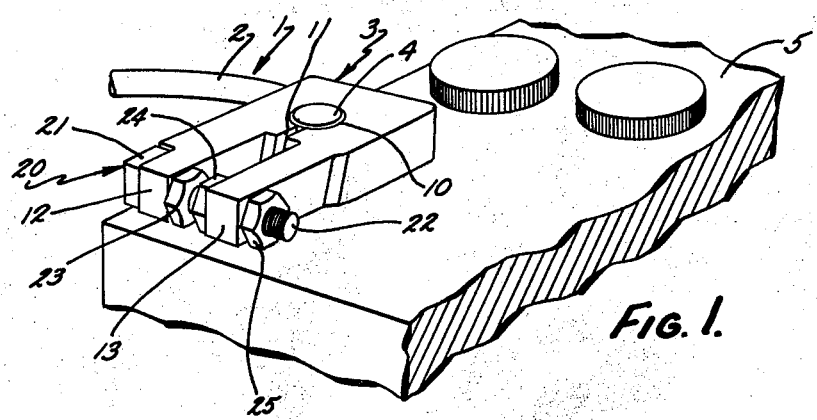
FIG. 1 is a perspective view of an embodiment of the battery cable clamp of this invention secured on the terminal post of a battery, only a portion of the battery being shown.

Referring more specifically to the drawing, the reference numeral 1 designates a battery cable having a cable 2 and a clamp 3 made in accordance with the teachings of this invention. As shown in FIG. 1, the clamp 3 is adapted to be secured to the terminal post 4 of a battery 5, as will be more fully explained hereinafter.

Figure 2:
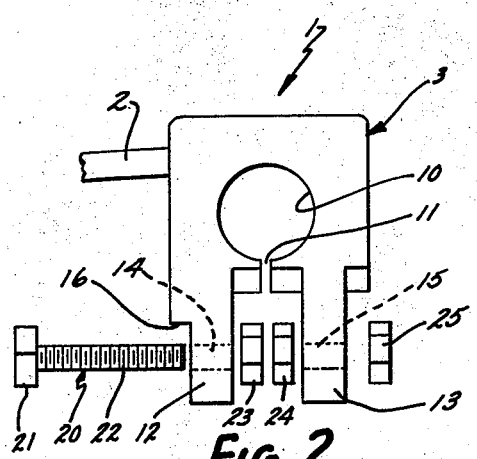
FIG. 2 is a plan, exploded view of the battery cable clamp shown in FIG. 1.
Figure 3:
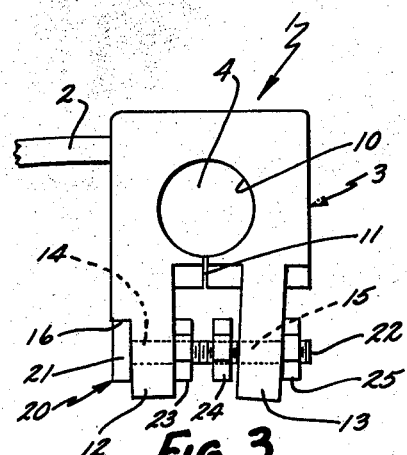
FIG. 3 is a plan view of the battery cable clamp shown in FIG. 1 assembled and secured to the terminal post of a battery.
Figure 4:
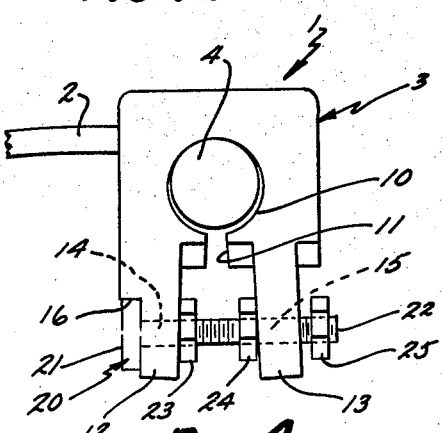
FIG. 4 is a plan view of the battery cable clamp similar to FIG. 3, the clamp being spread for removal thereof from the terminal post of a battery.

The clamp 3 is formed to include an opening 10 of a size approximating that of the terminal post 4 (FIGS. 2–4). The clamp is split at 11, a pair of legs 12 and 13 extending from opposite sides of the split 11. By the word "split," I means that the size of the opening may be varied. It will be seen that the positioning of the legs 12 and 13 with respect to one another determines the size of the opening 10 in the embodiment shown. Openings 14 and 15 are provided approximate the ends of the legs 12 and 13 respectively. A shoulder 16 is formed on the leg 12, the purpose of which will be explained hereinafter.

A bolt 20, having a head 21 and a threaded shaft 22 is provided for insertion through the openings 14 and 15 of the legs 12 and 13. The shaft 22 of the bolt 20 is threaded along essentially its entire length. Nuts 23, 24 and 25 are provided for cooperation with the bolt 20 and the clamp 3 as will now be explained fully.

In assembly, the shaft 22 of the bolt 20 is first inserted through the opening 14 in the leg 12. Next, the nut 23 is threaded on the shaft 22 to lie between the legs 12 and 13, adjacent the leg 12. The nut 24 is then threaded on the shaft 22, lying between the legs 12 and 13, adjacent the leg 13. Nuts 23 and 24 are rotated until the shaft 22 of the bolt 20 extends through the opening 15 in the leg 13. The nut 25 is then threaded on the end of the shaft 22.

Thus assembled, the clamp 3 is secured to the terminal post 4 of a battery 5 as follows. In normal position, the opening 10 in the clamp 3 is larger than the circumference of the terminal post 4, enabling the clamp to be slid over the terminal post as shown in FIG. 1. As best shown in FIG. 3, the nut 23 is turned by a suitable means, such as a wrench (not shown) to lie against the inward side of the leg 12. By tightening the nut 23 in this position, the bolt 20 is immovable with respect to the leg 12. The head 21 of the bolt 20 bears against the shoulder 16 on the leg 12, additionally aiding in preventing rotation of the bolt 20. The nut 24 is rotated to lie away from the leg 13. This enables the user to rotate nut 25, moving the leg 13 toward the leg 12, closing the split 11, and reducing the size of the opening 10 so that the clamp 3 grips the terminal post 4. With these steps, the clamp is secured to the post.

When one desires to remove the clamp 3 from the post 4, the nut 25 is rotated to lie away from the leg 13 as best shown in FIG. 4. This allows one to rotate the nut 24 against the leg 13, moving the leg 13 away from the leg 12, increasing the size of the split 11, enlarging the size of the opening 10 and thereby allowing one to simply lift the clamp off of the terminal post 4. With the simple movement of a conventional tool such as a wrench, the clamp may be removed. It will be seen that a tremendous mechanical advantage is gained through rotation of the nut 24, enabling the legs 12 and 13 to be separated as described. In order to reattach the clamp 3 to the post 4, the steps of the preceding paragraph are repeated.

It will now be seen that this invention has provided an improved battery cable clamp for attaching a battery cable to the terminal post of a battery. The structure includes a built-in means for removing the cable from the post at a later time. Thus, an extremely troublesome and annoying problem has been solved, the removal of the cable being effortless and the chances of damaging the battery being eliminated. This has been accomplished through the use of a structure retaining simplicity of design and fabrication, being inexpensive to manufacture.

While only one embodiment of this invention has been shown and described, it may be possible to practice the invention through the utilization of certain other embodiments without departing from the spirit and scope thereof.

Such other embodiments are to be included as part of this invention unless the following claim specifically states otherwise.

I claim:

A battery cable clamp for operably connecting a battery cable to the terminal post of a battery, comprising: a clamping element, said element having an opening for receiving a battery terminal post; said element being split and having a pair of legs extending therefrom on opposite sides of said split, the positioning of said legs determining the size of said opening; a bolt having a head with flat sides and a threaded shaft extending through openings in both of said legs proximate their ends; said shaft of said bolt threaded along a substantial portion of its length; a first nut for preventing movement of said bolt with respect to one of said legs, said one leg held between said head and said first nut; a shoulder on said one leg adjacent and engaging a flat side of said head, said shoulder shaped to prevent rotation of said bolt; and second and third nuts on said bolt on both sides of said other leg for moving said other leg in either direction along said bolt.

References Cited by the Examiner

UNITED STATES PATENTS

| | | | |
|---|---|---|---|
| 1,988,535 | 1/35 | Anderson | 339—230.1 |
| 2,032,834 | 3/36 | Bunker | 339—230.1 |
| 2,247,452 | 7/41 | Seils | 339—226 |
| 3,118,719 | 1/64 | Overby | 339—226 |

JOSEPH D. SEERS, *Primary Examiner.*